United States Patent [19]

Kato et al.

[11] Patent Number: 5,602,389
[45] Date of Patent: Feb. 11, 1997

[54] INFRARED SENSOR CALIBRATION APPARATUS USING A BLACKBODY

[75] Inventors: Akira Kato, Yokohama; Kayoko Kondo, Kawasaki, both of Japan

[73] Assignee: Kabushiki Kaisha Toshiba, Kawasaki, Japan

[21] Appl. No.: 501,936

[22] Filed: Jul. 13, 1995

[51] Int. Cl.⁶ .................................................. G01J 5/06
[52] U.S. Cl. ................................ 250/252.1; 250/493.1
[58] Field of Search ............................ 250/252.1 A, 493.1

[56] References Cited

U.S. PATENT DOCUMENTS

| | | | |
|---|---|---|---|
| 3,138,697 | 6/1964 | Banca et al. | 392/407 |
| 3,419,709 | 12/1968 | De Bell | 219/553 |
| 4,599,507 | 7/1986 | Hishikari et al. | 219/486 |
| 5,466,943 | 11/1995 | Green et al. | 250/493.1 |

FOREIGN PATENT DOCUMENTS 6-213705  8/1994  Japan .

Primary Examiner—Constantine Hannaher
Attorney, Agent, or Firm—Oblon, Spivak, McClelland, Maier & Neustadt, P.C.

[57] ABSTRACT

According to an infrared sensor calibration apparatus, one end of a cylindrical cover member is connected to the radiation surface of a blackbody such that they are thermally independent of each other, the other end thereof is provided opposite to an incidence entry of the infrared sensor, the blackbody and cylindrical cover member are controlled so as to have their respective predetermined temperatures, the intensity of the infrared rays incident upon the infrared-rays entrance based on the temperatures and the emissivity of the blackbody and cylindrical cover member, and the intensity is compared with an output of the infrared sensor, thereby calibrating the infrared sensor.

3 Claims, 4 Drawing Sheets

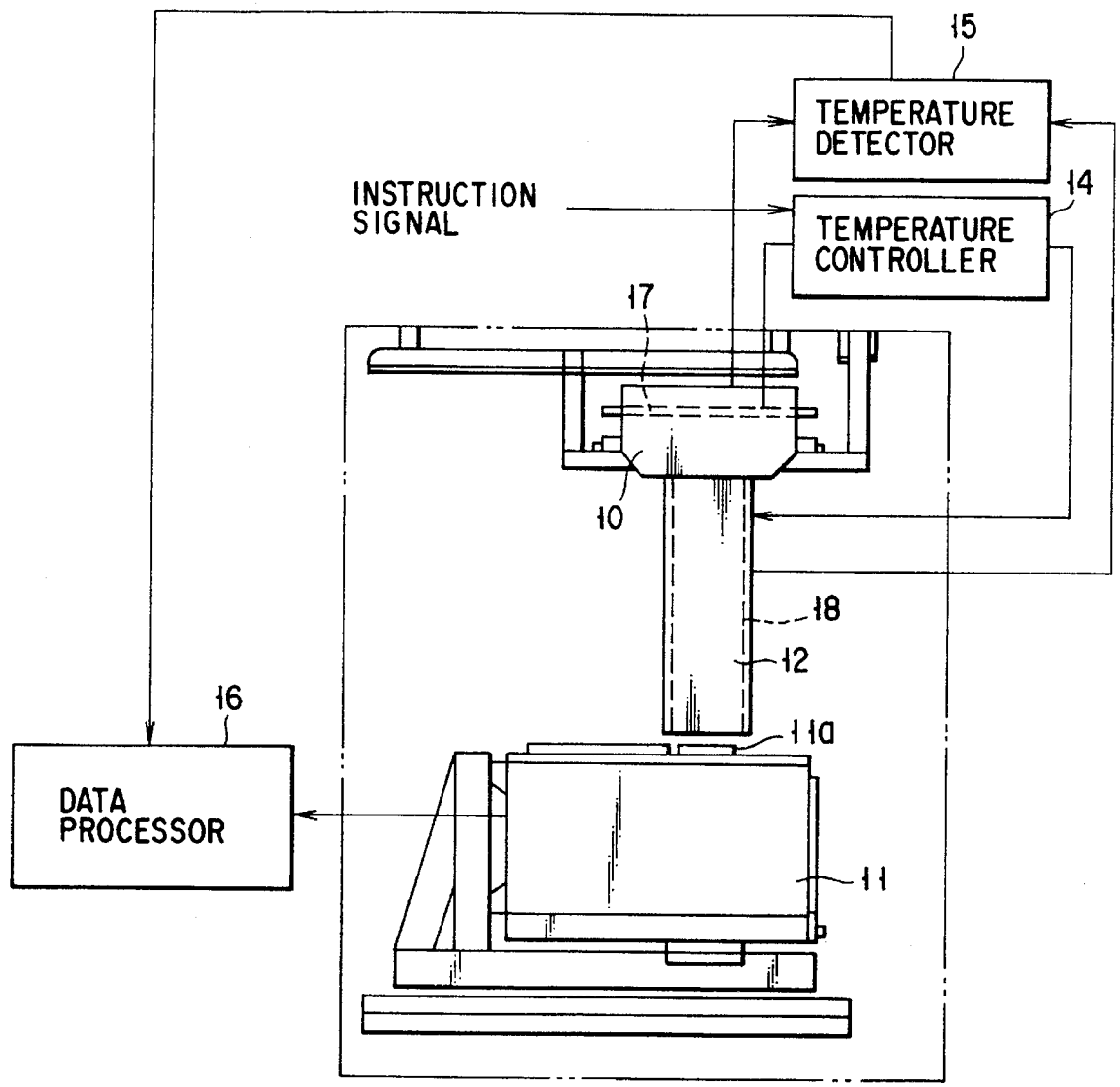
F I G. 1

INFRARED SENSOR CALIBRATION APPARATUS USING A BLACKBODY

BACKGROUND OF THE INVENTION

1. Field of the Invention

The present invention relates to an infrared sensor calibration apparatus used for calibrating an infrared sensor loaded into a space navigating object such as an artificial satellite.

2. Description of the Related Art

It is well-known that a blackbody is employed in an apparatus for calibrating an infrared sensor.

The strength of infrared rays radiating from the surface of the blackbody univocally depends upon the temperature and the emissivity of the surface by the Planck radiation law. Using this law, the infrared sensor measures the strength of the infrared rays radiating from the blackbody having a known temperature thereby to perform calibration, i.e., so-called graduation on the basis of the relationship between the voltage output from the infrared sensor and the temperature of the blackbody.

FIG. 3 shows a prior art apparatus for calibrating an infrared sensor 1 as described above. In this apparatus, a blackbody 2 is provided opposite to an incidence entry 1a of the sensor 1. A heating/cooling system 5 is buried into the blackbody 2. The system 5 is driven by a temperature controller 3 in response to a command signal and set to have a predetermined temperature. The infrared rays whose intensity are determined by the temperature of the system radiates from the blackbody 2 toward the incidence entry 1a.

The output of the infrared sensor 1 is connected to a data processing unit 4. The processing unit 4 processes data of voltage generated from a detector of the sensor 1. The output of a temperature detector 6 for detecting the temperature of the blackbody 2 is also connected to the data processing unit 4. The processing unit 4 is supplied with data of the temperature of the surface of the blackbody 2. Thus, the data processing unit 4 is so constructed that it compares the voltage data obtained from the infrared sensor 1 and the temperature data of the blackbody 2 to calibrate the infrared sensor.

Generally, the relationship between emissivity $\epsilon$ and reflectance r of the surface of an object is expressed by the following equation, assuming that the surface of the object does not absorb any infrared rays (absorptance $\alpha=0$).

$$\epsilon + r = 1 \qquad (1)$$

Using the Planck's radiation law, the radiant intensity L of infrared rays radiating from the surface of an object having a temperature of T1, can be given by the following.

$$L = \epsilon L(T1) \qquad (2)$$

In actuality, however, since the emissivity $\epsilon$ cannot be "1", the object has some reflectance r. Let us consider a model in which an object 7 is covered with an atmosphere 8 of temperature T2, as shown in FIG. 4. The effective radiant intensity L of this model is expressed as follows.

$$L = \epsilon L(T1) + rL(T2) \qquad (3)$$

In the foregoing prior art infrared sensor calibration apparatus, it is desirable that the emissivity $\epsilon$ of the radiating surface of the blackbody 2 should be "1" in order to calibrate the infrared sensor with high precision. If $\epsilon=1$, r becomes zero from the equation (1) and thus the second term of the equation (3) need not be taken into consideration, with the result that the radiant intensity of the blackbody 2 has only to be evaluated by the equation (2).

In the prior art apparatus described above, however, the emissivity $\epsilon$ of the radiation surface of the blackbody 2 is 0.8 to 0.9 and thus the reflectance r is 0.1 to 0.2. Since, as shown in FIG. 5, infrared rays B radiated from the environment and then reflected by the blackbody 2 and infrared rays C radiated directly from the environment as well as infrared rays A radiated from the blackbody 2, are incident upon the entry 1a of the sensor 1, these infrared rays B and C will become errors, in other words, an error will occur in the second term of the equation (3).

The intensity of infrared rays A can be easily obtained from the temperature of the blackbody 2, but that of infrared rays B or C cannot be correctly done in actuality. Therefore, the prior art infrared sensor calibration apparatus has the drawbacks wherein it is difficult to eliminate the errors of the infrared rays B and C and also difficult to compare the output voltage of the infrared sensor 1 and the temperature of the blackbody 2 with high precision.

SUMMARY OF THE INVENTION

An object of the present invention is to provide an infrared sensor calibration apparatus capable of detecting the correct radiant intensity with simple structure to improve in calibration precision.

To attain the above object, there is provided an infrared sensor calibration apparatus comprising:

a blackbody radiating the infrared rays;

a cylindrical cover member for guiding the infrared rays radiated from the blackbody to an incidence entry of an infrared sensor, at least an inner surface of the cylindrical member being painted black;

temperature detecting means for detecting temperatures of the blackbody and the cylindrical cover member;

temperature control means for setting each of the temperatures of the blackbody and the cylindrical cover member to a predetermined value; and calibration means for obtaining an intensity of the infrared rays incident upon the incidence entry of the infrared sensor based on the temperatures and the emissivity of the blackbody and the cylindrical cover member cover detected by the temperature detecting means, comparing the intensity of the infrared rays with an output of the infrared sensor, and calibrating the infrared sensor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a block diagram showing an infrared sensor calibration apparatus according to an embodiment of the present invention;

DETAILED DESCRIPTION OF THE PREFERRED EMBODIMENT

Figure 2:
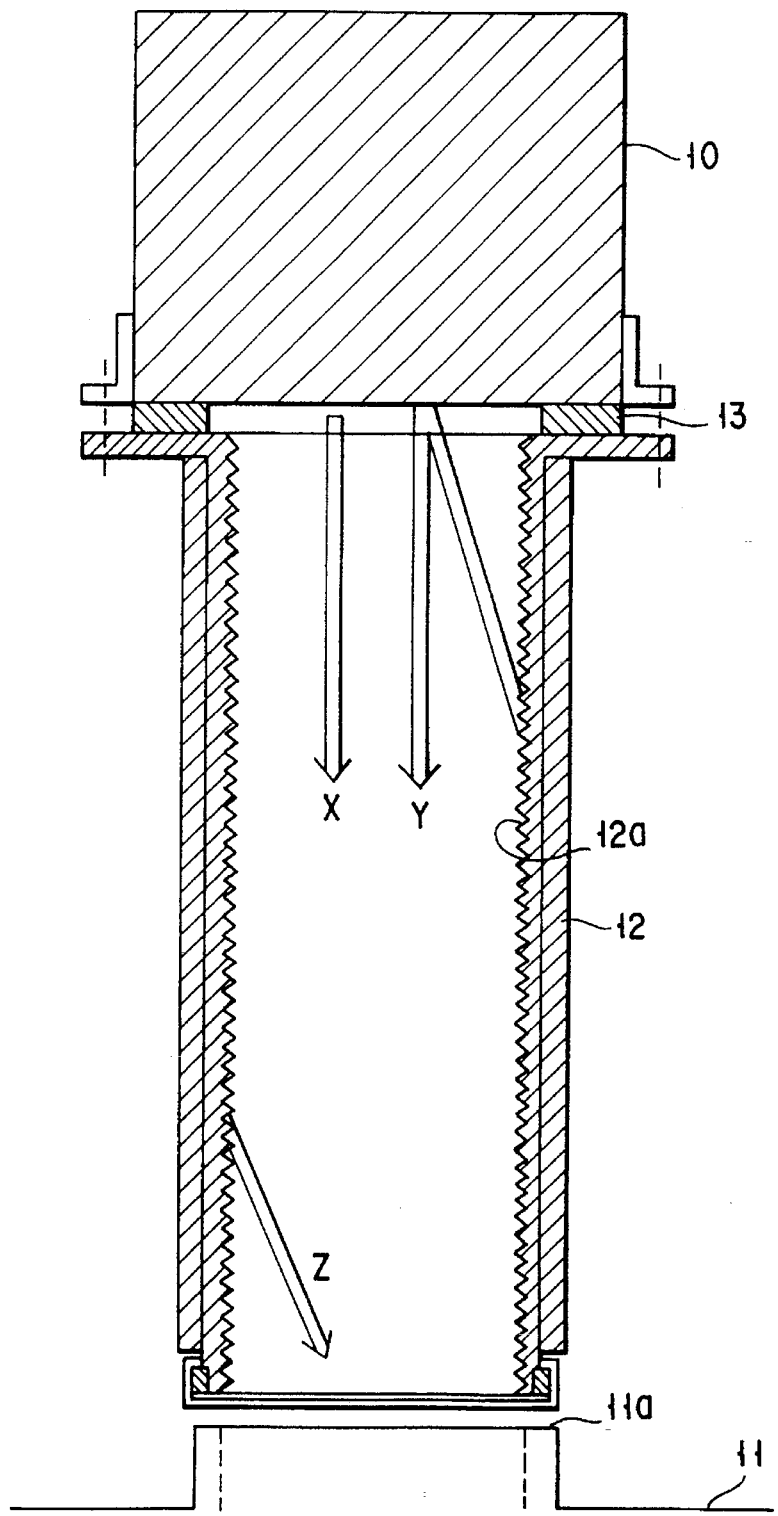
FIG. 2 is a cross-sectional view of the arrangement of a blackbody, a cylindrical cover member and an infrared sensor of the apparatus shown in FIG. 1.
Figure 3:
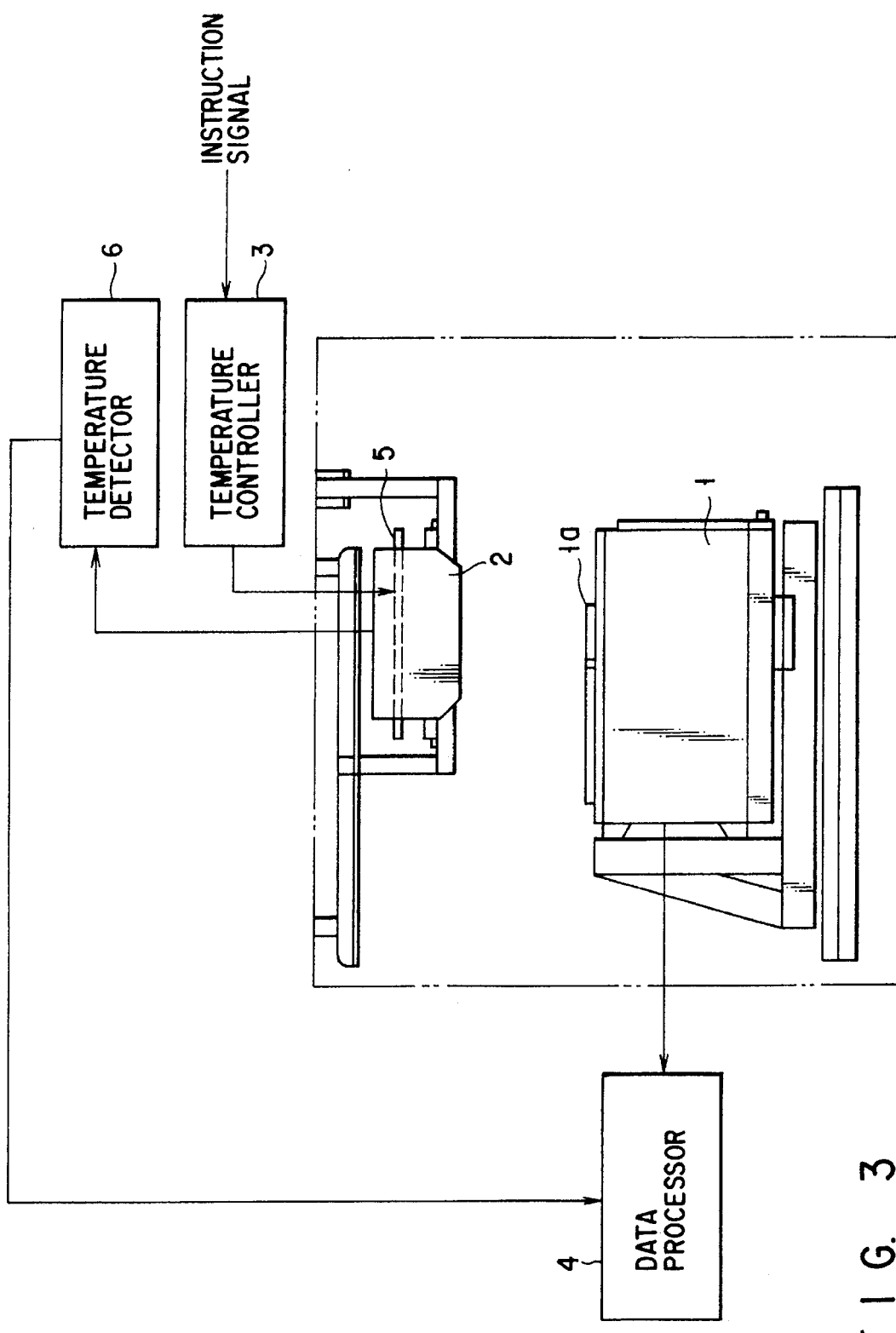
FIG. 3 is a block diagram showing a prior art infrared sensor calibration apparatus.
Figure 4:
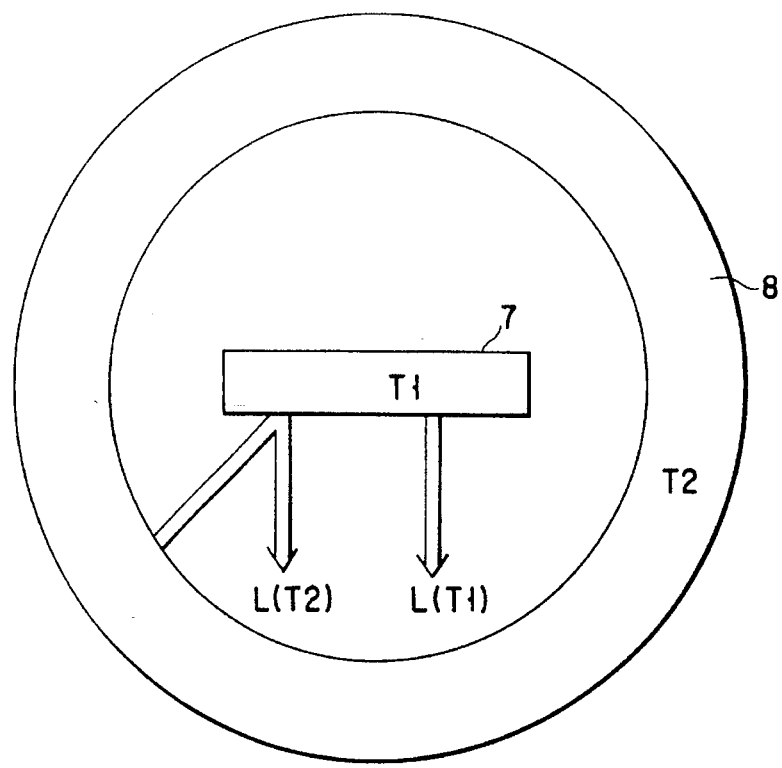
FIG. 4 is a plan view illustrating the relationship between the emissivity of a general object and the temperature of atmosphere surrounding the object.
Figure 5:
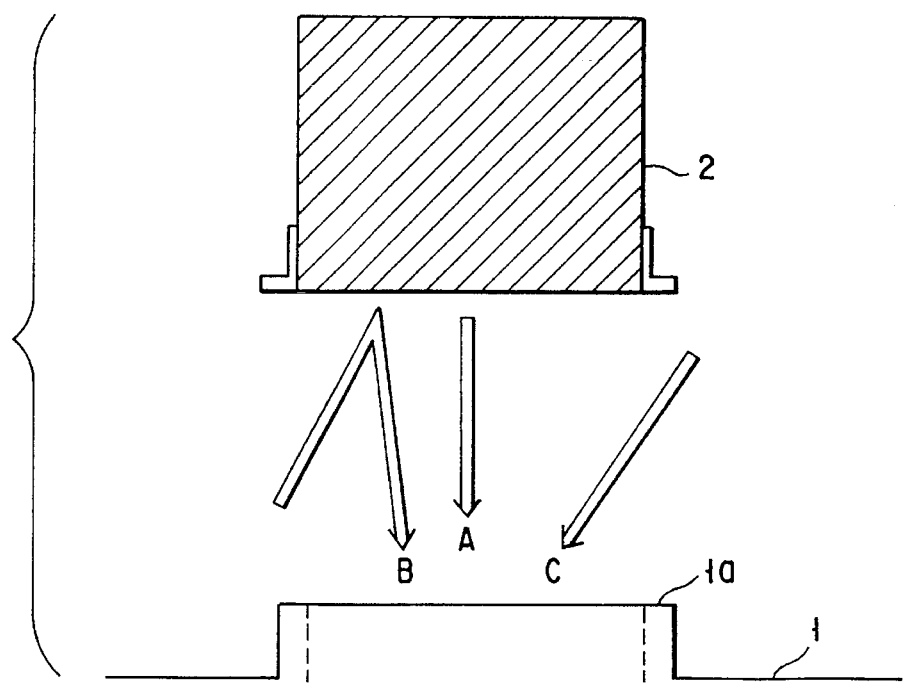
FIG. 5 is a front view of the arrangement of a blackbody and an infrared sensor of the prior art infrared sensor calibration apparatus shown in FIG. 3.

An embodiment of the present invention will now be described in detail with reference to the accompanying drawings.

FIG. 1 shows an infrared sensor calibration apparatus according to the embodiment of the present invention. The apparatus includes a blackbody 10 provided opposite to an infrared-rays incidence entry 11a of an infrared sensor 11. The blackbody 10 has an already-known emissivity $\epsilon$ and a slight reflectance r, and one end of a cylindrical cover member 12 is attached to the radiation surface of the blackbody 10 with a heat-insulating member 13 (shown in FIG. 2) interposed therebetween. The blackbody 10 and cylindrical cover member 12 are thermally independent of each other. The other end of the cylindrical cover member 12 is also provided opposite to the entry 11a of the sensor 11 with a predetermined space therebetween.

For example, a spiral groove 12a (shown in FIG. 2) is formed on the inner surface of the cylindrical cover member 12 and the inner surface thereof is painted black. The groove 12a thus decrease the reflectance of the member 12.

The blackbody 10 and cylindrical cover member 12 includes, for example, heating/cooling systems 17 and 18, respectively, as shown in FIG. 1, and these systems are operated by a temperature controller 14 to set the temperatures of the blackbody 10 and cylindrical cover member 12 to predetermined values. The temperatures of the blackbody 10 and cylindrical cover member 12 are detected by a temperature detector 15 constituted by a temperature sensor and the like. The output terminal of the temperature detector 15 is connected to a data processor 16.

The heating/cooling systems 17 and 18 are each constituted by burying, e.g., a liquid or gaseous nitrogen cooler and a heater into the wall of each of the blackbody 10 and the cylindrical cover member 12.

The data processor 16 is connected to the output terminal of the infrared sensor 11. This processor 16 compares the output value of the sensor 11 and the infrared-rays intensity calculated from the temperatures and the emissivity of the blackbody 10 and cylindrical cover member 12 to calibrate the infrared sensor.

In the apparatus having the above constitution, the calibration is performed as follows. The temperature controller 14 drives the cooling/heating systems 17 and 18 in response to, e.g., an externally supplied instruction signal and sets the temperatures thereof to predetermined values. Thus, as shown in FIG. 2, infrared rays X radiated from the blackbody 10, infrared rays Y reflected by the blackbody 10, and infrared rays Z radiated directly from the inner surface of the cylindrical cover member 12 are guided to the entry 11a of the sensor 11.

The temperature detector 15 detects the temperatures of the blackbody 10 and cylindrical cover member 12 and outputs them to the data processor 16. These infrared rays X, Y and Z correspond to the temperatures and the emissivity of the blackbody 10 and cylindrical cover member 12, and the data processor 16 calculates the intensity of the infrared rays incident upon the entry 11a on the basis of the temperatures and the emissivity of the blackbody 10 and cylindrical cover member 12.

At the same time, the data processor 16 is supplied with an output value of the infrared sensor 11 and compares the output value with the calculated infrared-rays intensity to calibrate the sensor.

The foregoing calibration is performed for each of the temperatures of the blackbody 10 and cylindrical cover member 12 which are varied by causing the temperature controller 14 to control the cooling/heating systems 17 and 18 in response to the instruction signal.

As described above, the infrared sensor calibration apparatus has the following constitution. One end of the cylindrical cover member 12 is attached to the radiation surface of the blackbody 10, and they are thermally independent of each other. The other end of the cylindrical cover member 12 is provided opposite to the entry 11a of the sensor 11. The blackbody 10 and cylindrical cover member 12 are each controlled to have a predetermined temperature, the intensity of infrared rays incident upon the infrared sensor 11 is obtained based on the temperatures and the emissivity of the blackbody 10 and cylindrical cover member 12, and the intensity of the infrared rays is compared with the output of the sensor 11, thus performing a calibrating operation for the sensor 11.

According to the above constitution of the infrared sensor calibration apparatus, the cylindrical cover member 12 shields the infrared rays radiated from the environment, and only the infrared rays X, Y and Z are incident upon the entry 11a. Since, therefore, the intensity of the infrared rays is correctly detected based on the temperatures and the emissivity of the blackbody 10 and cylindrical cover member 12, the infrared sensor can be calibrated with high reliability and high precision.

In the above embodiment, the spiral groove 12a is formed on the inner surface of the cylindrical cover member 12. The present invention is not limited to the spiral groove, but the spirals having various shapes can be employed.

Furthermore, no grooves need to be formed on the inner surface of the cylindrical cover member 12. In this case, the emissivity is lowered more slightly than in the case where the groove 12a is formed.

It is needless to say that the present invention is not limited to the above embodiment but various changes and modifications can be made without departing from the scope of the subject matter of the present invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An infrared sensor calibration apparatus comprising:

a blackbody radiating infrared rays;

a cylindrical cover member placed between said infrared sensor and said blackbody, one end being connected to an infrared radiation surface of said blackbody such that said cylindrical cover member is thermally independent of said blackbody and another end being provided opposite to the incidence entry of said infrared sensor at a predetermined distance, at least an inner surface of said cylindrical member being painted black;

temperature control means for setting each of the temperatures of said blackbody and said cylindrical cover member to a predetermined value;

temperature detecting means for detecting temperatures of said blackbody and said cylindrical cover member; and calibration means for obtaining an intensity of the infrared rays incident upon an incidence entry of said infrared sensor based on the temperatures of said blackbody and said cylindrical cover member detected by the temperature detecting means and comparing the intensity with an output of said infrared sensor, thereby calibrating said infrared sensor.

2. The apparatus according to claim 1, wherein said cylindrical cover member includes a groove on the inner surface painted black.

3. The apparatus according to claim 2, wherein said groove is formed spirally.

* * * * *